United States Patent
Gershony et al.

(10) Patent No.: US 6,549,218 B1
(45) Date of Patent: Apr. 15, 2003

(54) DYNAMIC EFFECTS FOR COMPUTER DISPLAY WINDOWS

(75) Inventors: Ori Gershony, Bellevue, WA (US); John Colleran, Redmond, WA (US); Michael A. Schmidt, Issaquah, WA (US); Vadim Gorokhovsky, Redmond, WA (US); J. Andrew Goossen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/282,872

(22) Filed: Mar. 31, 1999

(51) Int. Cl.[7] .................................................. G09G 5/00
(52) U.S. Cl. ........................ 345/781; 345/797; 345/790; 345/803
(58) Field of Search ........................... 348/569; 345/146, 345/113, 339, 340, 435, 344, 345, 343, 523, 524, 511, 186, 509, 781, 797, 790, 803

(56) References Cited

U.S. PATENT DOCUMENTS

| 4,903,217 A | 2/1990 | Gupta et al. ................. 364/521 |
| 4,910,704 A | 3/1990 | Gemma ........................ 364/900 |
| 5,475,812 A | * 12/1995 | Corona et al. ............... 395/158 |
| 5,522,025 A | * 5/1996 | Rosenstein .................. 345/158 |
| 6,111,614 A | * 8/2000 | Mugura et al. ............. 348/569 |

\* cited by examiner

Primary Examiner—Kristine Kincaid
Assistant Examiner—Mylinh T Tran
(74) Attorney, Agent, or Firm—Christensen, O'Connor Johnson Kindness PLLC (57) ABSTRACT

Output from an application or other program running in a windowing environment is redirected from the application to a bit map where it can be further manipulated prior to being displayed on the screen. A style bit is associated with each window from applications which are to be so redirected. Further parameters are associated with display of the window to provide position and size information and to provide special effects. Some special effects, such as transparency are identified by an alpha value, which enables further programs to manipulate the window in its associated bit map to make it appear transparent. One or more application program interfaces (APIs) provide the ability to specify the transparency, positioning, color key, size and other attributes as well as whether or not the window is redirected. This API may be utilized by the application to apply special effects to its windows., It may be used via a user interface to allow the user to select a desired window to redirect. It may be used by another application to create new UI by applying geometrical transforms to the visual bits in the redirection bitmap provided by the system.

24 Claims, 4 Drawing Sheets

DYNAMIC EFFECTS FOR COMPUTER DISPLAY WINDOWS

TECHNICAL FIELD

The present invention relates to electronic data processing, and more particularly to the redirection of windows for improved display on a computer display screen.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND

Graphical user interfaces are today the standard manner in which people interact with computers of almost every kind. From simple beginnings, many devices and layouts have evolved to permit the presentation of data in a variety of ways designed to make it easier to understand and more intuitive.

One of the earliest techniques of graphical interfaces was the use of multiple windows drawn on a single screen for displaying outputs from—and inputs to—multiple sources at once. Although multiple windows can arise from a single program on a computer, the usual screen includes windows from different programs executing independently of each other on the computer, or even on different computers.

The presence of multiple display windows on the same physical screen requires control over the manner in which the windows interact with each other. With some operating systems, the windows are provided by a window manager that obtains display information from multiple applications and manages the manner in which they are presented on a display screen. Some windows may be enlarged to cover the entire screen. The other windows are then covered by this enlarged window. At other times, many windows may be displayed on the screen at the same time, some overlapping or obscuring others. Usually, there is a primary window that is essentially a container of child windows and is itself a child of the desktop, called a top level window. The window manager keeps track of the z order of the windows. In other words, just like a stack of papers, the windows are stacked in a virtual "z" direction, which defines which windows will be on top of and obscure other windows.

Since the computer system may be processing information related to many of the applications with corresponding windows, it may be desirable for a user to see what is going on in more than one of the applications. Previously, users could resize windows, but this would result in perhaps only seeing a portion of the desired information, unless the information presented in a window is also resized, at which point, it may become too small to see. Larger screen sizes and multiple monitors have also been used to get around such a problem, but they are very expensive and take up much desktop space. Events in some applications may cause the window of information related to it to rise to the top of the pile, thus possibly obscuring other windows, and the contents of the window to be refreshed by the application. However, these window raising events can also raise the ire of a user who is concentrating on a project in the window currently on top.

With the large number of windows which may be open in today's multitasking world, there are also performance problems associated with window manipulation, such as moving a window or resizing it. In the Microsoft Windows 98® and NT operating systems, applications write to the screen only the portion of their associated window that is not obscured by other windows. Windows produced by applications normally paint via a handle to a display device context (DC) retrieved by calling BeginPaint or GetDC. By drawing via the display device context handle, the application draws directly to the screen and thus the system does not have a copy of the visual bits drawn by the window. Since a window may be partially or completely obscured by other windows on the screen, the visual bits cannot be reliably extracted by reading the bits from the screen buffer. When moving a window, there are many messages passed back and forth between the application and window manager to repaint the window as different portions of it become viewable due to a window move or resize. Repainting by the application is required, even though there may be no activity in the corresponding application. Thus, a window move, resize or other manipulation that results in obscured portions of other window being uncovered causes the application to perform work to generate such portions. In many game applications, constructs called "sprites" are used to represent graphical elements, which move within a window. The system recomposes them without need for the application to repaint them.

There is a need to provide an efficient and fast mechanism for managing the display and manipulation of frequently moving or animated windows on a viewing screen. There is also a need for the management of windows to provide the ability to view more information associated with obscured windows. There is yet a further need to allow applications to access and manipulate the visual bits of windows in different manners.

SUMMARY OF THE INVENTION

Output from an application or other program running in a windowing environment is redirected from the application to a bit map where it can be further manipulated prior to being displayed from a display screen buffer. The redirection can be performed on the windows of new applications as well as existing legacy applications. A style bit is associated with each window from applications which are to be so redirected. By providing selected windows with redirection bit maps, performance can be enhanced by not requiring each application to regenerate portions of windows which may be uncovered during manipulation of the windows by a presentation manager.

Further parameters may be associated with display of the window to provide position and size information and to provide special effects. Some special effects, such as transparency are identified by an alpha value and a color key, which enables further programs to manipulate the window in its associated bit map to make it appear transparent. The alpha value allows specification of a range of transparencies from totally transparent to opaque as desired. One or more application program interfaces (APIs) provide the ability to specify the transparency, positioning, color key, size and other attributes as well as whether or not the window is redirected. This API may be utilized by the application, or may be used via a user interface to allow the user to select a desired window to redirect. Thus, an application can control the transparency, positioning, color key, size and other attributes by using the API.

An independent application or a system shell utilizing the redirection functionality can to create a 3 dimensional or other representation of the applications running on a computer. This can be accomplished by instructing the system to redirect the drawing performed by legacy applications' windows, then reading from the redirection bit map, applying a 3D or other transform to it, and further drawing it in its own window. Thus, the application will not appear on the screen as it normally would, but would appear in a transformed form. Therefore, the redirection functionality can also be used to design a new user interface (UI) (3D or otherwise) using existing legacy applications.

The color key attribute can be used to specify the transparency applied to an identified color. In one example, the face of a clock window may be of a certain color which is specified as completely transparent. Only the hands of the clock and perhaps numerals identifying the hours are visible on a display screen. This allows it to overlay other windows without adversely affecting the viewing of information of such overlayed windows. The areas of the window that are completely transparent can also be clicked through thus allowing the end user to work with the overlayed window while keeping the layered window on top.

By specifying the transparency of an entire window generated by an application, it can essentially be seen through, to allow viewing of activity in windows provided by other applications if desired. Dialogs for background tasks can also be transparent. Further, by having selected windows in bit maps, they may be more easily repainted simply by obtaining them from their bit maps rather than having the corresponding applications repaint them directly, which would consume much system resource. Still further, effects may be applied to the bit map without having to modify any of the drawing related code in an application.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. The second section describes the manner by which a window may be redirected to a bit map where it may be manipulated to provide special effects. A third section describes the application programming interfaces and provides flowcharts of the interaction of the applications producing windows and the presentation manager which provides information to a screen buffer from which it is displayed. These sections are followed by a conclusion which briefly describes the invention and some of the one or more benefits which may be provided by the invention.

Hardware and Operating Environment

Figure 1:
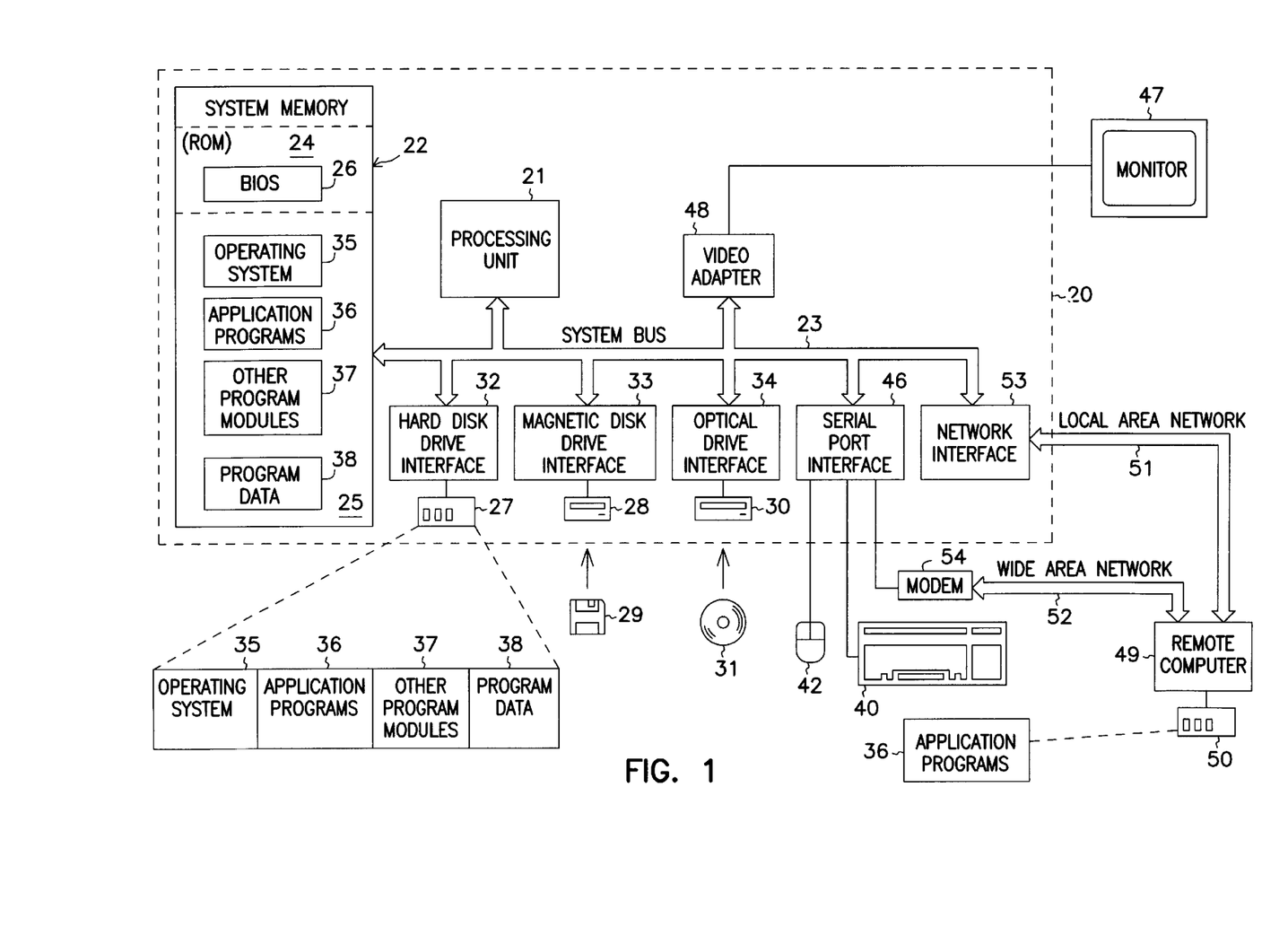
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Redirection

Figure 2:
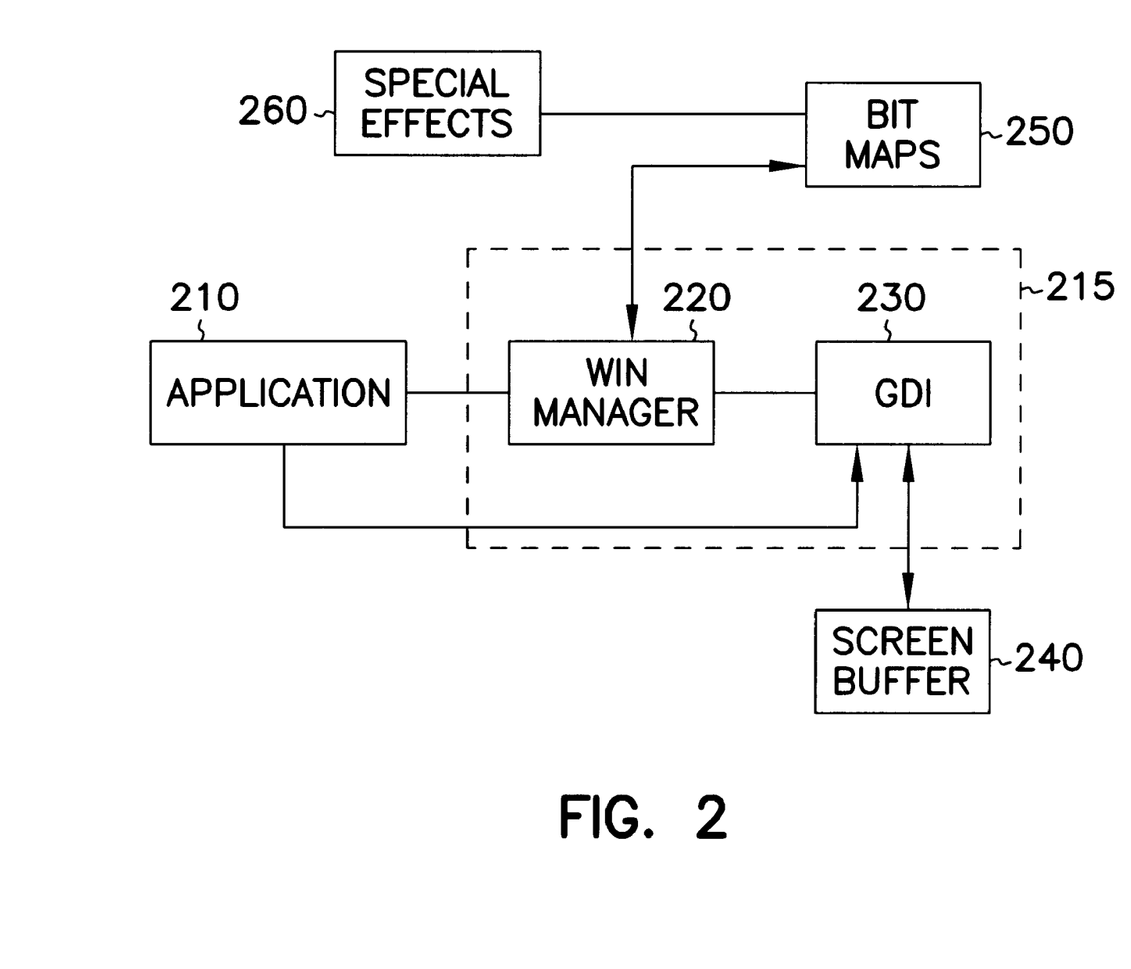
FIG. 2 is a block diagram representation showing interaction between applications having window presentation material, a presentation manager and a screen buffer in accordance with the present invention.

In a legacy drawing model in a "MICROSOFT® WINDOWS®" and related operating system environments, applications indicated at 210 in FIG. 2, provide information in the form of a window to be displayed on a display device. A presentation manager 215 comprising a window manager 220 and graphical device interface (GDI) 230 provide the information to a screen buffer 240 from which the information is directly displayed. The window manager 220 maintains a list of windows which are on the display device screen, and also controls how windows share the screen space, delegating real estate to them. It interfaces with applications to provide windows for display. GDI 230 provides the actual interface and bits to the screen buffer 240. The block representing application 210 is representative of any programming, including operating system code that produces information to be displayed in a window. There are usually several applications running at the same time, and the windows provided by them may overlap, such that much of the information may be obscured by other windows. The windows corresponding to the applications have a z-axis order to them, which defines which windows obscure other windows; in essence, which windows are on top.

When a window is moved, as by a common drag and drop operation, the portions of windows which are obscured may be uncovered. However the screen buffer 240 only contains information about each window which is visible. The portions that are uncovered by the move must be regenerated by their corresponding applications. The corresponding applications receive a paint message from the presentation manager 215 directing them to generate bits representative of the windows they need to display and directing them to send them to a device context in win manager 220. The device context has a special area which directs the GDI 230 not to write in certain areas for that context, corresponding to where the window is obscured. Some of such messages contain commands indicating which portions of their window are not obscured such that they only need to process sufficient information to generate the visible portions of the windows. Some applications must repeat previous processing to regenerate a window that may not have changed. Further, if other changes have occurred to data in the application such as a spread sheet, the entire window may have to be regenerated regardless. Thus, much system resource can be consumed in updating multiple windows during simple operations. If there are many windows open, this process can consume significant system resource for simple operations.

To alleviate this problem and provide other potential benefits, applications are provided with the ability to set a style bit associated with the window of information they provide which indicates that the window should be stored in a bit map 250, which is a memory area of sufficient size to hold the entire window generated by the application. Bit map 250 may be part of system memory 22, or other memory which has a data path between the application and the screen buffer 240, either directly or through other functional blocks. A block labeled special effects 260 is coupled or otherwise has access to the bit map 250 and provides the ability to add programs to manipulate and process the bits stored in the bit map to provide special effects, such as alpha blending which provides various levels of transparency for the window. Multiple bit maps 250 may be provided, such that multiple windows may be stored in the same manner. By setting the style bit associated with a window, the bits corresponding to display of that window are redirected to the bit map 250 by the window manager 240.

To create a layered window, a style bit referred to as WS_EX_LAYERED is specified when performing a normal CreateWindowEx function or SetWindowLong call after the window is already created.

It is also understood that the redirection functionality can and will be exposed in other ways. For example, a WS_EX_REDIRECTION bit can be exposed by the system to allow redirection of window' drawing. When such a style bit is set on a window the system will stop displaying it on the screen. An application can use the visual bits of the window to better incorporate it into its drawing scheme. For example, a container (Visual Basic, MFC; or Internet Explorer) can redirect a windowed ActiveX control. Also, an application can easily be written that can redirect existing applications to create a new user interface (UI), 3D or otherwise as represented by special effects block 260. Such an application would paint windows in a normal manner such that user commands such as mouse clicks could be applied if performed by a user on such windows.

Figure 3:
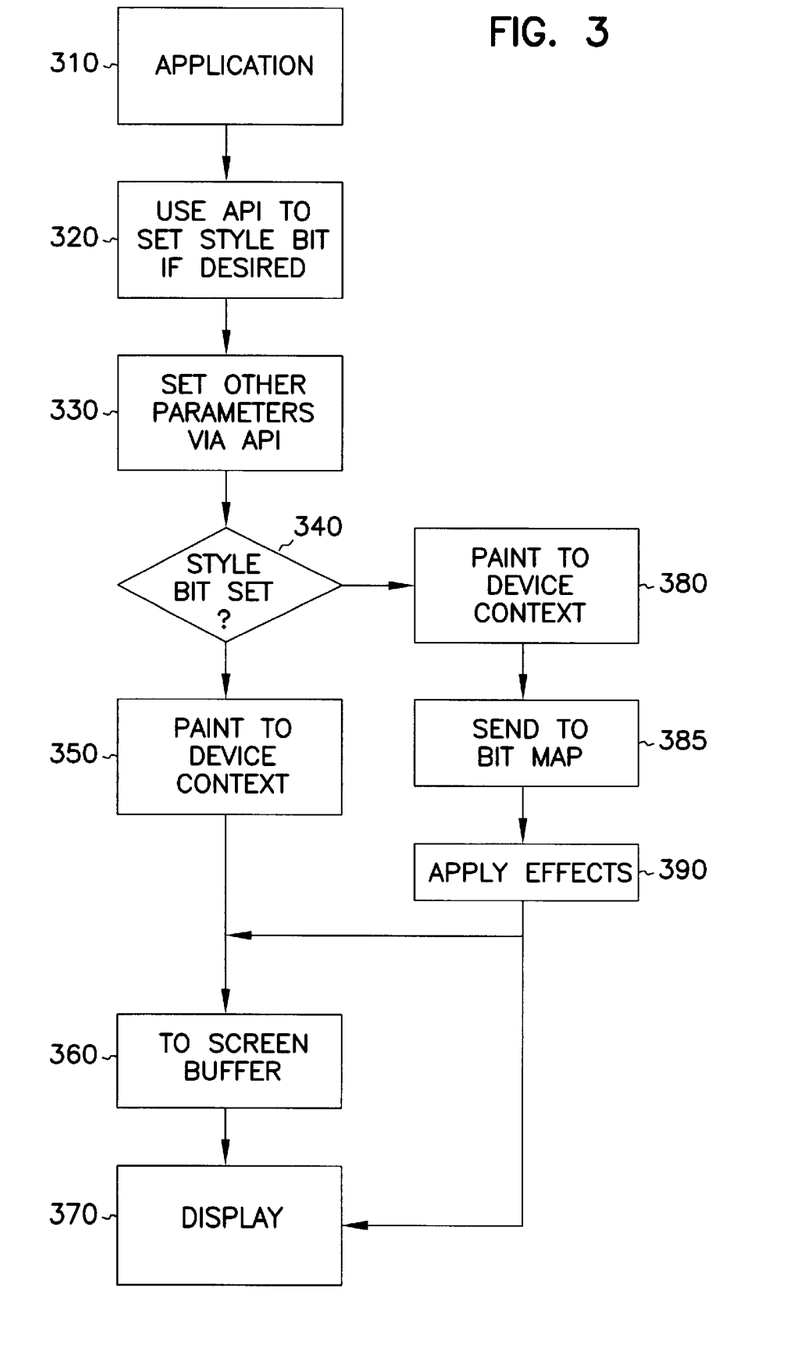
FIG. 3 is a flow chart representation of the steps involved in redirecting window presentation information from an application.

FIG. 3 shows in flowchart form how the style bit is set and how bits are processed. At 310, an application receives a paint or repaint command. At 320, the application or user through a separate interface uses the above API to set a style bit for a window of information it desires to display. The style bit may be the WS_EX_REDIRECTION bit to invoke a new UI, or another bit which simply indicates that the window is to be redirected and potential special effects are to be applied. The application can receive direction from many different sources, including user commands or program manager commands that a window should be redirected by setting the style bit. The bit may also be set prior to the command at 310. Once the style bit is set for a window, other parameters may also be specified at 330, such as an alpha or transparency value. This value takes on an integer in the range of zero to 255, with zero being completely transparent and 255 being opaque. Other values may be easily implemented. Other parameters comprise a color key parameter which indicates a particular color to apply the alpha to. This allows special effects 260 to make only that color transparent. The API also provides the ability to specify the positioning and size of the window whether or not the window is redirected. This API may be utilized by the application, or may be used via a user interface to allow the user to select a desired window to redirect. Thus, an application can control the transparency, positioning, color key, size and other attributes by using the API.

If this is the first time that a window is being painted by an application, a device context is associated with the window by the window manager. The device context will check the style bit at 340 to determine whether or not the window is to be redirected. The presentation manager will obtain the bit map and inform the device context of its location. The device context will also utilize a bounds accumulation to determine the smallest possible area of the window that was repainted and thus needs to be recomposed by the presentation manager or an application redirecting windows. Thus, the bounds accumulation construct is used to determine whether or not the window will need to be recomposed on the screen due to changes that may have occurred. In addition to the time when the device context is released, the accumulated bounds can be checked on a timer to accommodate device contexts that are rarely or never released. If the window size has changed, the system will invalidate the window and cause a paint message to be sent to the application causing it to repaint the areas of the window that have been revealed.

If the style bit is not set,.processing will continue as it has in legacy systems at 350, with the application painting the window to the device context, followed by the device context properly clipping portions of the window and sending it through the GDI 230 to the screen buffer at 360. From the screen buffer, multiple windows in proper overlapping format are sent to the display 370. The presentation manager also needs to ensure that sibling top-level windows on the screen do not clip the window bound for the bit map. In one embodiment, the screen buffer is contained in video adapter 48.

If the style bit is detected as being set at 340, then the window is redirected following painting to the device context at 380. It is then sent to the bit map at 385, where effects may be applied at 390 in accordance with the parameters that were previously set. In further embodiments, the special effects may be provided independent of the parameters and may be determined by a separate application or user. Once the effects are applied, the window may be written to the screen buffer through the presentation manager 215, or may even be written directly to the display if desired.

The accumulated bounds are used to determine what areas of the window have been painted and thus need to be recomposed on the screen. Upon expiration of the timer, the presentation manager will check to see if the bounds have changed. The painting of a child window (which is a component of a window and is always within the window) is also redirected into the redirection bit map associated with the redirected window.

Figure 4:
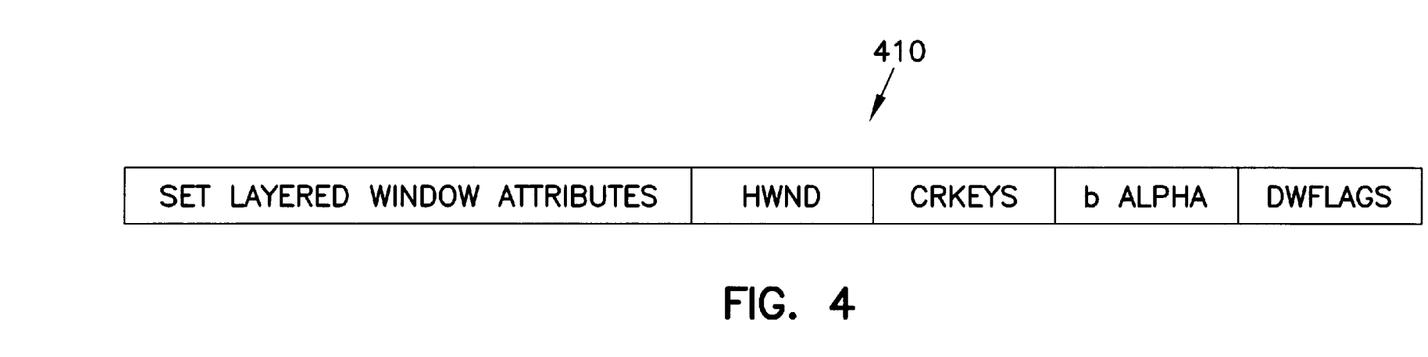
FIG. 4 is a block representation of an API used to provide redirectioning of windows.

FIG. 4 is a block diagram that shows one example of an API used by the application to identify the window and specify parameters to be used in redirecting windows and providing special effects. Windows will not become visible until these parameters have been set SetLayeredWindowAttributes, shown at 410 in FIG. 4 is used to set the opacity level or the transparency color key for a given layered window. The SetLayeredWindowAttributes call sets the opacity and the transparency color key of a layered window. The parameters shown include hwnd, crKey, bAlpha, and dwFlags. The hwnd parameter is the handle of the layered window. A window is made layered by specifying WS_EX_LAYERED when creating the window with the CreateWindowEx function or by setting WS_EX_LAYERED via SetWindowLong after the window has been created.

cfKey specifies the transparency color key to be used when composing the layered window. All pixels painted by the window in this color will be transparent.

bAlpha is the value used to describe the opacity of the layered window. When bAlpha is 0, it is assumed that the window is completely transparent. When bAlpha is 255, it is assumed that the window is completely opaque.

There are also several dwFlags, such as LWA_COLORKEY, which indicates to use crKey as the transparency color. It can be combined with LWA_ALPHA, which indicates that bAlpha is used to determine the opacity of the layered window. Using these flags, one can specify a color to apply transparency effects to.

There are several return values to the API. If the function succeeds, the return value is non-zero. If the function fails, the return value is zero. Further error information may also be provided if desired.

After the SetLayeredWindowAttributes call, the presentation manager may still ask the window to paint as discussed above when it is resized or otherwise modified. For faster and more efficient animation or if per-pixel alpha is needed, applications can call UpdateLayeredWindow to supply directly the shape and content of layered window without using redirection.

In one example, the face of a clock window may be of a certain color which is specified as completely transparent. Only the hands of the clock and perhaps numerals identifying the hours are visible on a display screen. This allows it to overlay other windows without adversely affecting the viewing of information of such overlayed windows. The mouse events over the completely transparent areas of the layered windows are passed through to the next appropriate window in z-order.

A task bar may also be specified as transparent. Many other special effects may be provided if desired, such as having a window explode into multiple pieces upon being closed. The possibilities are limitless, and the API can be easily expanded to include many other flags and parameters to invoke such effects.

CONCLUSION

Output from an application window or other program running in a windowing environment is redirected to a bit map. These visual bits can be further manipulated, either by the system or another application, prior to being displayed on the screen . A style bit is associated with each window from applications which are to be so redirected. By providing selected windows with redirection bit maps, performance can be enhanced by not requiring each application to regenerate portions of windows which may be uncovered during manipulation of the windows by a presentation manager.

While the use of a single bit to specify redirection is described, other data structures may be used, such as bytes or words, and the location of such structures may be as a header to the actual window bits, located with the window context in the presentation manager, or included in a separate object associated with the originating application or window. There may be several bit maps used at the same time having different levels of transparency. It should be noted that the word transparent or transparency is used to denote that the window has a specified opacity. In other words, transparent is not necessarily an absolute, but simply signifies that it may be seen through at some level. Further, the location and size of the bit map may be varied as desired. In one embodiment, it is sized to fit the current size of the window. If the size of the window is varied, the application is usually involved in repainting the window. In further embodiments, the special effects program or programs 260 may be configured to do so if sufficient information exists in the bit map.

The order of the fields in the API may also be varied without departing from the scope of the invention. The API may be used by other programs, or may be provided on a task bar to the user to specify the desired parameters and select desired windows. This application is intended to cover any adaptations or variations of the present invention. It is manifestly intended that this invention be limited only by the claims and equivalents thereof.

We claim:

1. A method of displaying multiple windows of information on a computer display screen comprising:

forming a bit map in a component separate from a screen buffer;

obtaining a window from an application to be displayed;

determining if a style bit associated with the window is set, the setting of said style bit indicating that the window is to be redirected to the bit map;

if the style bit associated with the window is determined to be set, redirecting the window from the application to the bit map in said separate component, without directly displaying said window;

providing the window from the bit map in said separate component to said screen buffer; and displaying said window from said screen buffer on the display screen.

2. The method of claim 1 and further comprising specifying a special effect to apply to the window in the bit map.

3. The method of claim 1 and further comprising specifying an amount of transparency to apply to the window in the bit map.

4. The method of claim 3 wherein the amount of transparency is specified in the form of an integer having values between approximately 0 and 255.

5. The method of claim 3 wherein clicks from a user interface device are applied to a window beneath a window having a transparency.

6. The method of claim 1 and further comprising specifying a color and transparency of such color to apply to the window in the bit map.

7. The method of claim 1 and wherein the bit map is formed at a size consistent with the size of the window to be redirected.

8. The method of claim 1 wherein a device context is formed to handle interfacing between the application, the bit map and the screen buffer.

9. The method of claim 1 and further comprising;

moving a window on the screen which affects an amount of the window in the bit map which is viewable; and providing the window from the bit map for display of previously hidden portions of such window.

10. The method of claim 1 and further comprising:

detecting selected changes to be applied to the window in the bit map; and directing the application to repaint said window in the bit map.

11. A computer-readable medium having instructions stored thereon for causing a computer to perform a method of displaying multiple windows of information on a computer display screen comprising:

forming a bit map in a component separate from a screen buffer;

obtaining a window from an application to be displayed;

determining if a style bit associated with the window is set, the setting of said style bit indicating that the window is to be redirected to the bit map;

if the style bit associated with the window is determined to be set, redirecting the window from the application to the bit map in said separate component, without directly displaying said window; and providing the window from the bit map in said separate component to said screen buffer; and displaying said window from said screen buffer on the display screen.

12. The computer readable medium of claim 11 and having instructions stored thereon for further causing the computer to perform an addition method of:

moving a window on the screen which affects an amount of the window in the bit map which is viewable; and providing the window from the bit map for display of previously hidden portions of such window.

13. A computer-readable medium having instructions stored thereon for causing a computer to perform a method of displaying multiple windows of information on a computer display screen comprising:

forming a bit map in a component separate from a screen buffer;

obtaining a window from an application to be displayed;

determining if a style bit associated with the window is set, the setting of said style bit indicating that the window is to be redirected to the bit map;

if the style bit associated with the window is determined to be set, redirecting the window from the application to the bit map in said separate component;

specifying a special effect to apply to the window in the bit map in said separate component; and providing the window from the bit map in said separate component to said screen buffer; and displaying said window from said screen buffer component on the display screen.

14. The computer readable medium of claim 13 wherein clicks from a user interface device are applied to a window beneath a window having a transparency special effect.

15. A computer-readable medium having instructions stored thereon for causing a computer to perform a method of displaying multiple windows of information on a computer display screen comprising:

forming a bit map in a component separate from a screen buffer;

obtaining a window from an application to be displayed;

determining if a style bit associated with the window is set, the setting of said style bit indicating that the window is to be redirected to the bit map;

if the style bit associated with the window is determined to be set, redirecting the window from the application to the bit map in said separate component;

specifying a special effect to apply to the window in the bit map in said separate component;

detecting selected changes to be applied to the window in the bit map in said separate component; and directing the application to repaint said window.

16. A presentation manager for a computer system having a plurality of applications generating windows for display from a screen buffer, the presentation manager comprising:

a module that provides a bit map in a component separate from a screen buffer for application windows requesting such a bit map;

a module that obtains application windows to be displayed, and for each application window obtained:

(i) determines if a style bit associated with the application window is set, the setting of said style bit indicating that the window is to be redirected to the bit map, and (ii) if the style bit associated with the application window is determined to be set, redirects the application window to its respective bit map in said separate component, without directly displaying said window; and a module that obtains the windows from the bit maps in said separate component and sends the windows to the screen buffer for display from the screen buffer.

17. The presentation manager of claim 16 and further comprising:

a module that detects selected changes to be applied to a window in a bit map; and a module that directs a corresponding application to repaint said window.

18. A computer system having a plurality of application-generating windows for display from a screen buffer, the computer system comprising:

a processor for executing the applications;

a memory for storing the applications and other data;

a display device for displaying windows created by the applications;

a screen buffer for providing pixel information to a display from the applications representative of such windows;

a presentation manager that manages the pixel information provided to the screen buffer for display of multiple windows;

a bit map component, separate from the screen buffer for storing without directly displaying the pixel information associated with an application, wherein the pixel information is provided to the screen buffer from the separate bit map component for display; and a module that obtains the windows for display and for each window determines if a style bit associated with the window is set, the setting of said style bit indicating that the window is to be redirected to the bit map, and if the style bit associated with the window is determined to be set, redirects the window to the bit map.

19. A presentation manager for managing the display of multiple windows of information provided by applications running on a computer system, the presentation manager comprising:

means for forming a bit map in a component separate from a screen buffer;

means for obtaining a window from an application to be displayed;

means for determining if a style bit associated with the window is set, the setting of said style bit indicating that the window is to be redirected to the bit map;

means for responding to a determination that the style bit associated with the window is set, by redirecting the window from the application to the bit map in said separate component, without directly displaying said window; and means for providing the window from the bit map in said separate component to said screen buffer and for displaying said window from said screen buffer on the display screen.

20. A presentation manager for managing the display of multiple windows of information provided by applications running on a computer system, the presentation manager comprising:

means for forming a bit map in a component separate from a screen buffer;

means for obtaining a window from an application to be displayed;

means for determining if a style bit associated with the window is set, the setting of said style bit indicating that the window is to be redirected to the bit map;

means for responding to a determination that the style bit associated with the window is set, by redirecting the window from the application to the bit map in said separate component;

means for specifying a special effect to apply to the window in the bit map in said separate component;

means for detecting selected changes to be applied to the window in the bit map in said separate component; and means for directing the application to repaint said window.

21. A computer-readable medium having a data structure stored thereon for use by a computer in presenting multiple windows of information provided by applications running on the computer system, the data structure comprising:

an identifier of a window;

a style bit that is set to indicate that the window is to be redirected to a bit map in a component separate from a screen buffer, wherein said window is stored in said bit map in said separate component without being directly displayed; and a value of transparency to be applied to the window in the bit map in said separate component.

22. The data structure of claim 21, further comprising:

a colorkey that identifies a color; and a colorkey flag that indicates that the transparency value is to be used on the identified color.

23. A method of displaying multiple windows of information on a computer display screen, comprising:

forming a bit map in a component separate from a screen buffer;

obtaining a window from an application to be displayed;

determining if a style bit associated with the window is set, the setting of said style bit indicating that the window is to be redirected to the bit map;

if the style bit associated with the window is determined to be set, redirecting the window from the application to the bit map in said separate component;

providing special effects on the window from the bit map in said separate component; and providing said window in said bit map in said separate component to said screen buffer for display on the display screen.

24. The method of claim 23, wherein the special effects comprise a user interface applied to the window from the bit map by a user interface application.

* * * * *

UNITED STATES PATENT AND TRADEMARK OFFICE
CERTIFICATE OF CORRECTION

PATENT NO. : 6,549,218 B1
DATED : April 15, 2003
INVENTOR(S) : O. Gershony et al.

It is certified that error appears in the above-identified patent and that said Letters Patent is hereby corrected as shown below:

Title page,
Item [57], ABSTRACT,
Line 8, "such as transparency" should read -- such as transparency, --
Line 16, "its windows.," should read -- its windows. --
Line 17, "It may be" should read -- Or it may be --

Column 1,
Line 19, "in the drawing" should read -- in the drawings --

Column 2,
Line 8, "Microsoft Windows 98 ®" should read -- Microsoft® Windows® 98 --
Line 27, "of other window" should read -- of another window --
Line 59, "parency" should read -- parency, --
Line 60, "which enables" should read -- which enable --

Column 3,
Line 6, "can to create" should read -- can create --
Line 25, "through thus" should read -- through, thus --

Column 5,
Line 43, "within 20" should read - within PC 20 --

Column 6,
Lines 14-15,""MICROSOFT® WINDOWS®"" should read
-- MICROSOFT® WINDOWS® --
Line 16, "FIG. 2," should read -- FIG. 2 --
Line 34, "them, which" should read -- them that --
Line 38, "However" should read -- However, --
Line 45, "win manager" should read -- window manager --

Column 7,
Line 21, "window' drawing." should read -- windows' drawing. --
Line 25, "MFC;" should read -- MFC, --
Line 43, "commands" should read -- commands, --
Line 49, "and 255 being" should read -- and 255 being --

UNITED STATES PATENT AND TRADEMARK OFFICE
CERTIFICATE OF CORRECTION

PATENT NO. : 6,549,218 B1
DATED : April 15, 2003
INVENTOR(S) : O. Gershony et al.

It is certified that error appears in the above-identified patent and that said Letters Patent is hereby corrected as shown below:

<u>Column 8,</u>
Line 47, "have been set" should read -- have been set. --
Line 48, "FIG. 4" should read -- FIG. 4, --
Line 67, "indicates to use crKey" should read -- indicates the use of crKey --

<u>Column 9,</u>
Line 14, "layered window" should read -- layered windows --
Line 38, "screen ." should read -- screen. --
Line 53, "word transparent or transparency is" should read --words "transparent" or "transparency" are --

<u>Column 10,</u>
Line 43, "comprising;" should read -- comprising: --
Line 67, "window; and" should read -- window; --

<u>Column 11,</u>
Line 27, "component; and" should read -- component; --

<u>Column 14,</u>
Line 1, "claim 21," should read -- claim 21 --
Lines 2 and 3, "colorkey" should read -- color key --
Line 22, "claim 23," should read -- claim 23 --

Signed and Sealed this

Thirtieth Day of September, 2003

JAMES E. ROGAN
*Director of the United States Patent and Trademark Office*